(12) United States Patent
Kosugi et al.

(10) Patent No.: US 11,051,104 B2
(45) Date of Patent: Jun. 29, 2021

(54) ACOUSTIC DEVICE

(71) Applicant: KABUSHIKI KAISHA TOKAI RIKA DENKI SEISAKUSHO, Aichi (JP)

(72) Inventors: Masanori Kosugi, Aichi (JP); Takashi Nagao, Aichi (JP); Tatsushi Katsuyama, Aichi (JP); Takeyoshi Mori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/645,726

(22) PCT Filed: Sep. 7, 2018

(86) PCT No.: PCT/JP2018/033272
§ 371 (c)(1),
(2) Date: Mar. 9, 2020

(87) PCT Pub. No.: WO2019/059005
PCT Pub. Date: Mar. 28, 2019

(65) Prior Publication Data
US 2020/0304915 A1  Sep. 24, 2020

(30) Foreign Application Priority Data
Sep. 19, 2017  (JP) ............................. JP2017-179090

(51) Int. Cl.
*H04R 5/02* (2006.01)
*B60R 11/02* (2006.01)
*B60R 11/00* (2006.01)

(52) U.S. Cl.
CPC ............ *H04R 5/02* (2013.01); *B60R 11/0217* (2013.01); *B60R 2011/001* (2013.01); *H04R 2499/13* (2013.01)

(58) Field of Classification Search
CPC ............ B60R 11/0217; B60R 11/0223; B60R 11/0264; B60R 2011/001; B62D 1/04; B62D 1/046; H04R 1/025
See application file for complete search history.

(56) References Cited

U.S. PATENT DOCUMENTS 4,736,410 A * 4/1988 Nishida ............... H04M 1/2747
455/564
4,850,015 A 7/1989 Martin
(Continued)

FOREIGN PATENT DOCUMENTS

JP 2003-299199 A 10/2003
JP 2010-4361 A 1/2010
(Continued)

OTHER PUBLICATIONS

Laura McQuarrie—Steering Wheel Speakers; This Handy Device Helps You Take Calls While Driving—Oct. 30, 2014—Tech; https://www.trendhunter.com/trends/steering-wheel-speakers.

*Primary Examiner* — Mark Fischer
(74) *Attorney, Agent, or Firm* — Roberts Calderon Safran & Cole P.C.

(57) ABSTRACT

An acoustic device to be mounted in a vehicle, the acoustic device including at least two speakers arranged before a front face of an occupant sitting in a seat to sandwich a center line of the seat and a control unit that controls characteristics of sound output from each of the speakers such that a stereophonic sound image produced by sounds output from the at least two speakers is maintained. The at least two speakers are installed on a steering wheel of the vehicle.

8 Claims, 3 Drawing Sheets

(56) References Cited

U.S. PATENT DOCUMENTS

| | | | |
|---|---|---|---|
| 6,307,941 B1* | 10/2001 | Tanner, Jr. | H04S 1/002 |
| | | | 381/1 |
| 2003/0142835 A1 | 7/2003 | Enya et al. | |
| 2007/0211574 A1* | 9/2007 | Croft, III | H04R 23/00 |
| | | | 367/197 |
| 2019/0273977 A1 | 9/2019 | Miyasaka et al. | |

FOREIGN PATENT DOCUMENTS

| | | |
|---|---|---|
| JP | 2012-231448 A | 11/2012 |
| WO | 2018/096761 A | 5/2018 |

* cited by examiner

ACOUSTIC DEVICE

CROSS-REFERENCE TO RELATED APPLICATIONS

The present application is a U.S. National Phase of PCT/JP2018/033272 filed on Sep. 7, 2018 claiming priority to Japanese Patent Application No. 2017-179090 filed on Sep. 19, 2017. The disclosure of the PCT Application is hereby incorporated by reference into the present Application.

CROSS-REFERENCES TO RELATED APPLICATIONS

The present patent application claims the priority of Japanese patent application No. 2017/179090 filed on Sep. 19, 2017, and the entire contents of Japanese patent application No. 2017/179090 are hereby incorporated by reference.

TECHNICAL FIELD

The invention relates to an acoustic device and, in particular, to an acoustic device to be mounted in a vehicle.

BACKGROUND ART

In a vehicle three-dimensional acoustic device, a technique is present that three-dimensional audio images are produced by sounds output from right and left main speakers arranged rearward of an occupant (driver) and sound output from a sub-speaker arranged in front of the occupant (see, e.g., Patent Literature 1). The acoustic device is, for example, configured such that the left speaker is arranged on the left shoulder of the backrest of the driver's seat so as to face the front of the vehicle and the right speaker is arranged on the right shoulder so as to face the front of the vehicle. Also, it is configured such that the sub-speaker is arranged in front of the occupant at, e.g., a lower portion of a steering column or a dashboard etc.

CITATION LIST

Patent Literature

Patent Literature 1: JP 2010/4361 A

SUMMARY OF INVENTION

Technical Problem

The acoustic device disclosed in Patent Literature 1 may be problematic in that the installation positions of the speakers are far from the occupant (driver) and, therefore, the output of the speaker needs to be increased so as to deliver a prescribed level sound to the occupant.

It is an object of the invention to provide an acoustic device which can reduce the output of the speaker needed to deliver a prescribed level sound to the occupant.

Solution to Problem

According to an embodiment of the invention, an acoustic device is configured as defined by [1] to [10] below.
[1] An acoustic device to be mounted in a vehicle, the acoustic device comprising: at least two speakers arranged before a front face of an occupant sitting in a seat to sandwich a center line of the seat; and a control unit that controls characteristics of sound output from each of the speakers such that a stereophonic sound image produced by sounds output from the at least two speakers is maintained, wherein the at least two speakers are installed on a steering wheel of the vehicle.
[2] The acoustic device according to [1], wherein the at least two speakers are symmetrically arranged with respect to a center line of the steering wheel.
[3] The acoustic device according to [1] or [2], wherein one of the at least two speakers which is located on a right side with respect to the center line is positioned so as to provide a directivity increased toward a right ear of the occupant, and wherein one of the at least two speakers which is located on a left side with respect to the center line is positioned so as to provide a directivity increased toward a left ear of the occupant.
[4] The acoustic device according to any one of [1] to [3], wherein the at least two speakers are arranged to face upward at a predetermined angle such that an output axis thereof is in a direction of an ear of the occupant.
[5] The acoustic device according to any one of [1] to [4], wherein an output directivity of the at least two speakers, respectively is omnidirectional.
[6] The acoustic device according to any one of [1] to [5], wherein the at least two speakers are installed on a switch device mounted on the steering wheel.
[7] The acoustic device according to any one of to [6], wherein the at least two speakers are arranged on right and left spokes of the steering wheel or in a switch part on the right and left spokes of the steering wheel.
[8] The acoustic device according to any one of [1] to [7], wherein the control unit comprises a phase shift means and an adding means, wherein the phase shift means performs a phase-delay processing to delay a phase of a sound signal of a right channel corresponding to one of the at least two speakers located on a right side with respect to the center line and a phase of a sound signal of a left channel corresponding to one of the least two speakers located on a left side with respect to the center line, and wherein the adding means outputs a drive signal of the right and left channels, respectively by adding the sound signal of the right channel to the sound signal of the left channel phase-delayed by the phase shift means and the sound signal of the left channel to the sound signal of the right channel phase-delayed by the phase shift means.
[9] The acoustic device according to [8], wherein the control unit sets respective phase differences for the phase shift means such that, at a right ear of the occupant, a synthetic sound of sound based on the sound signal of the right channel and sound based on the sound signal of the right channel phase-delayed by the phase shift means is maximized and a synthetic sound of sound based on the sound signal of the left channel and sound based on the sound signal of the left channel phase-delayed by the phase shift means is minimized, and at a left ear of the occupant, a synthetic sound of sound based on the sound signal of the left channel and sound based on the sound signal of the left channel phase-delayed by the phase shift means is maximized and a synthetic sound of sound based on the sound signal of the right channel and sound based on the sound signal of the right channel phase-delayed by the phase shift means is minimized.
[10] The acoustic device according to [9], wherein the control unit sets the respective phase differences for the phase shift means such that, at the right ear, a phase difference between the sound based on the sound signal of the right channel and the sound based on the sound signal of the right channel phase-delayed by the phase shift means is $2\pi n$ (n=0, 1, 2 ...) and a phase difference between the sound based on the sound signal of the left channel and the sound based on the sound signal of the left channel phase-delayed by the phase shift means is $\pi n$ (n=0, 1, 2 ...), and at the left ear, a phase difference between the sound based on the sound signal of the left channel and the sound based on the sound signal of the left channel phase-delayed by the phase shift means is $2\pi n$ (n=0, 1, 2 ...) and a phase difference between the sound based on the sound signal of the right channel and the sound based on the sound signal of the right channel phase-delayed by the phase shift means is $\pi n$ (n=0, 1, 2 ...).

Advantageous Effects of Invention

According to an embodiment of the invention, it is possible to provide an acoustic device which can reduce the output of the speaker needed to deliver a prescribed level sound to the occupant.

DESCRIPTION OF EMBODIMENTS

Embodiment of the Invention

Figure 1:
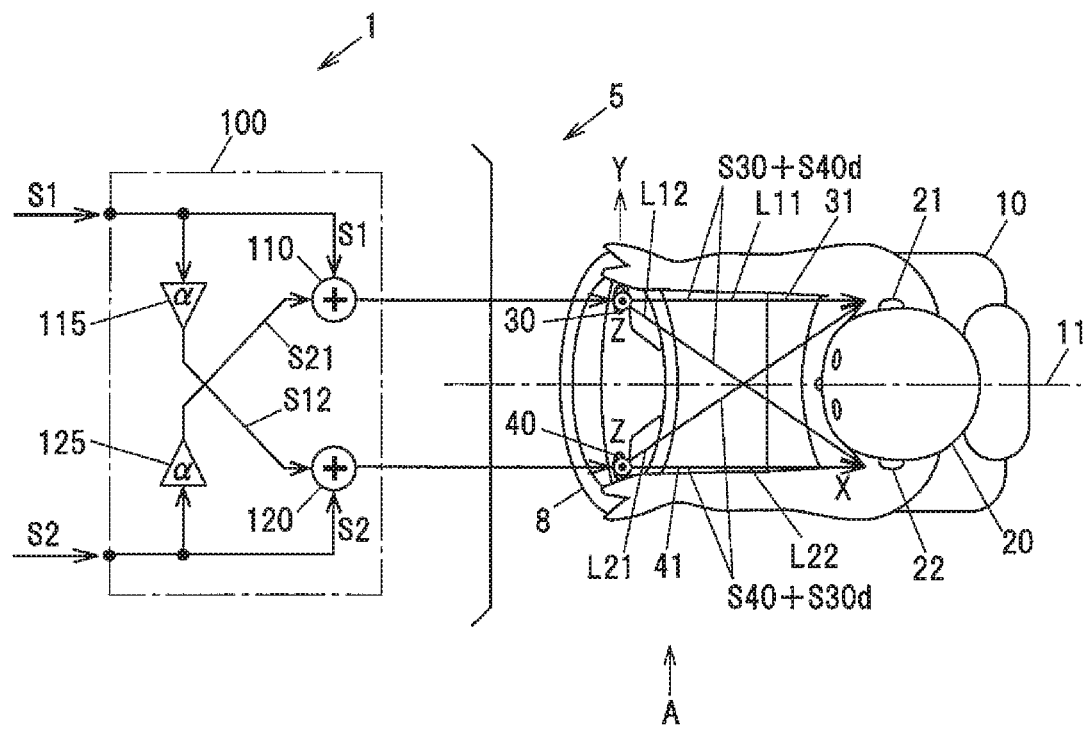
FIG. 1 is a top view showing an example arrangement of speakers of an acoustic device in an embodiment when viewing a vehicle from above.

An acoustic device 1 in the embodiment of the invention is mounted in a vehicle 5 and is provided with two speakers 30, 40 arranged with a center line 11 of a seat 10 in-between and located in front of a driver 20 as an occupant sitting in the seat 10, and a control unit 100 that controls the characteristics of sound output from each speaker so that a stereophonic sound image produced by sounds output from the two speakers 30, 40 is maintained, wherein the two speakers 30, 40 are provided in a steering wheel 8 of the vehicle 5.

In the present embodiment, an example in which the occupant is the driver 20 will be described. In addition, the two speakers 30, 40 symmetrically arranged with respect to a center line 8a of the steering wheel 8 will be described as an example of the at least two speakers.

(Arrangement of the Speakers)

As shown in FIG. 1, the two speakers 30, 40 are arranged in front of the seat 10, i.e., in front of the driver 20 sitting in the seat 10 in the vehicle 5. The two speakers 30, 40 are symmetrically arranged with respect to, e.g., the center line 8a of the steering wheel 8. The speakers 30, 40 can output sound in a predetermined frequency band and can output, e.g., warning tones or warning sound, etc., based on control from the vehicle side.

In FIG. 1, a direction from the speaker to the ears of the driver 20 and from the front toward the rear of the vehicle 5 is defined as the X direction, a width direction of the vehicle 5 is defined as the Y direction, and a vertical direction of the vehicle 5 as the cross product of the X axis and the Y axis is defined as the Z direction. As shown in FIG. 1, the right speaker 30 is positioned to have high directivity in a direction toward the right ear 21 of the driver 20. Likewise, the left speaker 40 is positioned to have high directivity in a direction toward the left ear 22 of the driver 20. That is, by mounting the speakers 30, 40 on the steering wheel 8, an output axis 31 of the right speaker 30 can be oriented in the direction toward the right ear 21 of the driver 20, and an output axis 41 of the left speaker 40 can be oriented in the direction toward the left ear 22 of the driver 20.

Figure 2:
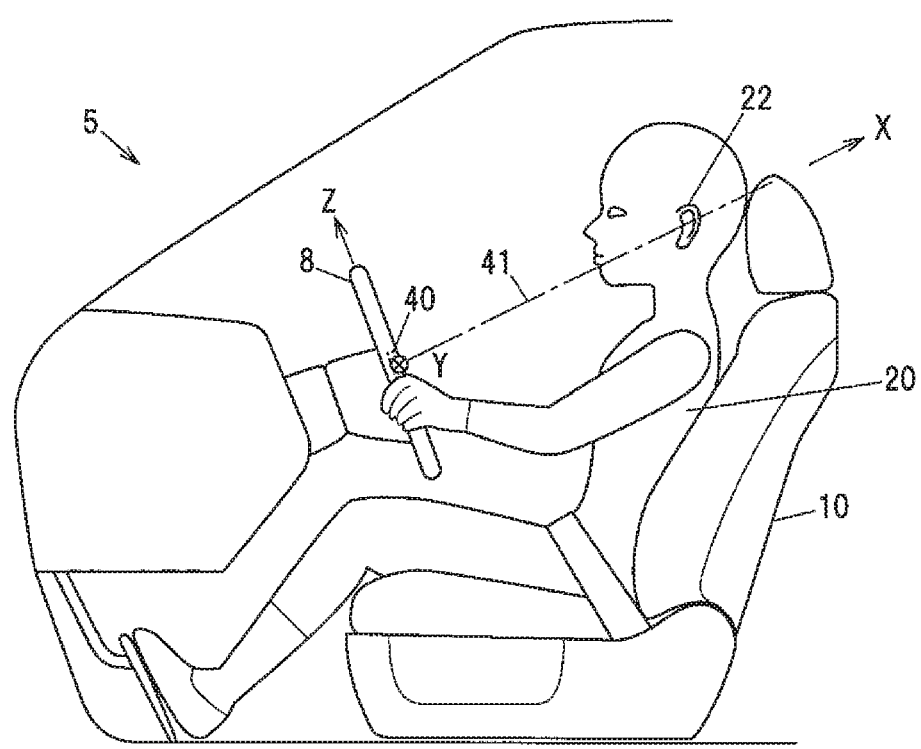
FIG. 2 is a side view when the acoustic device is viewed in the direction A in FIG. 1.

Meanwhile, as shown in FIG. 2, the left speaker 40 is arranged to face slightly upward and toward the ears of the driver 20. Thus, the X, Y and X axes are located such that the X axis and the Z axis are slightly rotated about the Y axis, as shown in FIG. 2.

As shown in FIG. 2, since the speakers 30, 40 are mounted on the steering wheel 8, the left speaker 40 is arranged to face slightly upward (the X axis direction) so that the output axis 41 of the left speaker 40 is oriented in the direction toward the left ear 22 of the driver 20. The right speaker 30 is also arranged to face slightly upward (the X axis direction) in the same manner. In this arrangement, the two speakers 30, 40 have high directivity in the direction toward the ears 21, 22 of the occupant.

(Arrangement Example 1 of the Speakers 30, 40)

Figure 3A:
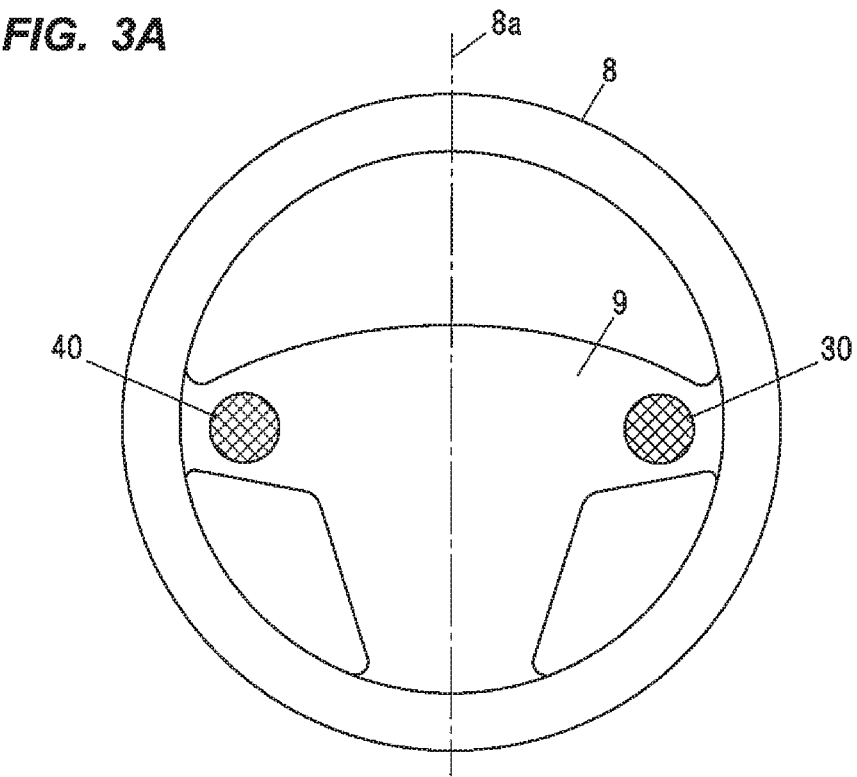
FIG. 3A is a front view showing a steering wheel when the right and left speakers are respectively provided on spokes of the steering wheel, as one example of arrangement of the speakers of the acoustic device in the embodiment.

As shown in FIG. 3A, it is possible to configured such that the two speakers 30, 40 are provided respectively on spokes 9 of the steering wheel 8. In other words, it is possible to arrange the right speaker 30 on the right spoke 9 and the left speaker 40 on the left spoke 9, with the center line 8a of the steering wheel 8 in-between. The center line 8a of the steering wheel 8 here is a line passing through the center of the steering wheel 8 when the steering angle is zero, i.e., the steering wheel is not manipulated. A right sound signal S and a left sound signal S2 to the right speaker 30 and the left speaker 40 can be input from a vehicle main body side via, e.g., a steering roll connector (illustration omitted).

(Arrangement Example 2 of the Speakers 30, 40)

Figure 3B:
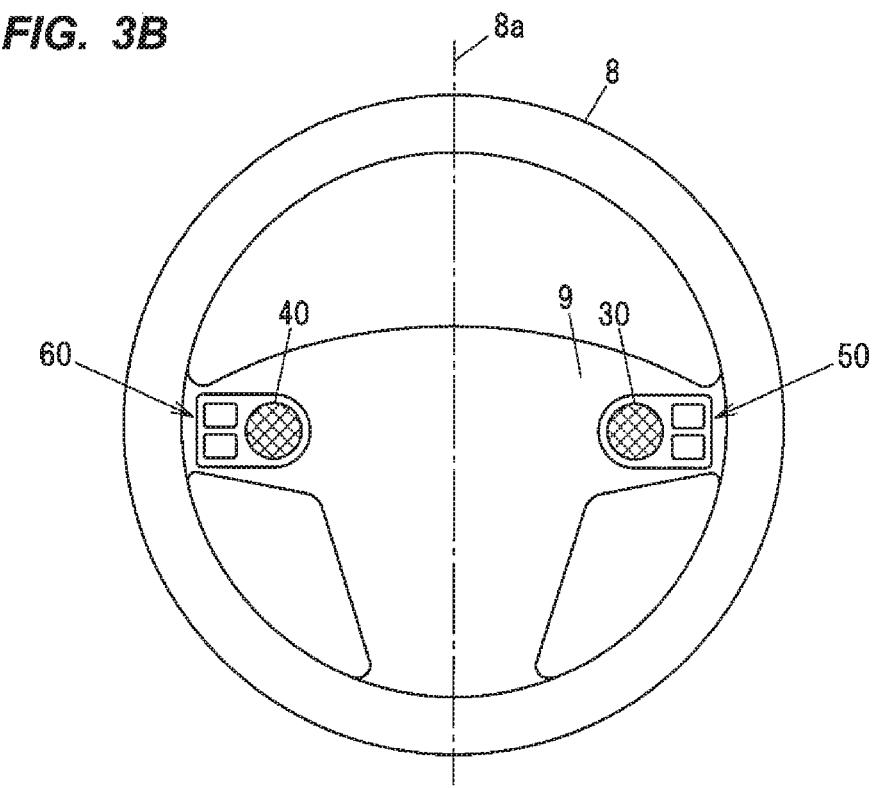
FIG. 3B is a front view showing the steering wheel when the right and left speakers are provided in steering switches mounted on the steering wheel, as another example of arrangement of the speakers of the acoustic device in the embodiment.

As shown in FIG. 3B, it is possible to configured such that the two speakers 30, 40 are provided respectively in steering switches 50, 60 as switch devices mounted on the steering wheel 8. In other words, it is possible to arrange the right speaker 30 in the steering switches 50 provided on the right spoke 9 and the left speaker 40 in the steering switches 60 provided on the left spoke 9, with the center line 8a of the steering wheel 8 in-between. The steering switches 50, 60 are switches associated with vehicle operation and can be used for air-conditioning control, audio control, and car navigation operation, etc. The two speakers 30, 40, together with the steering switches 50, 60, can be electrically connected to the vehicle main body via, e.g., the steering roll connector (illustration omitted). The right sound signal S1 and the left sound signal S2 to the right speaker 30 and the left speaker 40 can be input from the vehicle main body side via, e.g., the steering roll connector (illustration omitted).

(Directivity Characteristics of the Speakers)

Figure 4A:
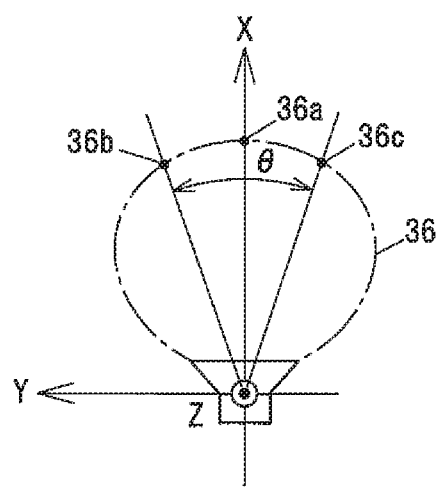
FIG. 4A is an explanatory diagram illustrating directivity characteristics of the speaker on the X-Y plane when directivity of the speaker is omnidirectional.
Figure 4B:
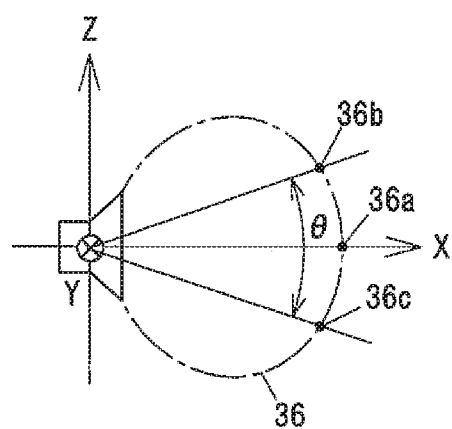
FIG. 4B is an explanatory diagram illustrating directivity characteristics of the speaker on the X-Z plane when directivity of the speaker is omnidirectional.

FIGS. 4A and 4B show directivity characteristics of the speaker when directivity of the speaker is omnidirectional. In the directivity characteristics shown in FIG. 4A, sound output from the speaker 30, 40 spreads such that directivity is highest at a point 36a on the x-axis of a sound plane 36 and has a directivity angle θ which is an opening angle defined by points 36b, 36c at which sound pressure is 6 dB less than the maximum sound pressure on the x-axis. In FIG. 4A, the directivity angle in the Y direction is 0.

In the directivity characteristics shown in FIG. 4B, sound output from the speaker 30, 40 spreads such that directivity is highest at the point 36a on the x-axis in the sound plane 36 and has a directivity angle θ which is an opening angle defined by the points 36b, 36c at which sound pressure is 6 dB less than the maximum sound pressure on the x-axis. In FIG. 4B, the directivity angle in the Z direction is 0.

As understood from FIGS. 4A and 4B, since the directivity angle is 0 in both the X and Z directions, the directivity characteristics of the speaker shown in FIGS. 4A and 4B are omnidirectional (non-directional). By mounting such omnidirectional speakers 30, 40 on the steering wheel 8, sound images produced by sounds output from the speakers 30, 40 are easily localized even when the steering wheel 8 is rotationally manipulated to drive the vehicle 5.

(Sound Image Localization Control by the Control Unit)

As shown in FIG. 1, the control unit 100 is provided with a drive part 110 for driving the right speaker 30 and a drive part 120 for driving the left speaker 40. The drive part 110 drives the right speaker 30 by adding up and amplifying the right sound signal S1 and a phase shifted signal S21 of the left sound signal S2. Likewise, the drive part 120 drives the left speaker 40 by adding up and amplifying the left sound signal S2 to a phase shifted signal S12 of the right sound signal S1.

A phase shift circuit 115 shifts (delays) the phase of the right sound signal S1 and then outputs the phase shifted signal S12 to the drive part 120. For the phase shift, a phase difference α° between the right sound signal S1 and the phase shifted signal S12 can be appropriately set.

Likewise, a phase shift circuit 125 shifts (delays) the phase of the left sound signal S2 and then outputs the phase shifted signal S21 to the drive part 110. For the phase shift, a phase difference α° between the left sound signal S2 and the phase shifted signal S21 can be appropriately set. In this regard, the phase difference α° here is used when the two speakers 30, 40 are symmetrically arranged across a center line 11 of a seat 10, and the phase difference can be different between the phase shift circuit 115 and the phase shift circuit 125 when, e.g., the speakers 30, 40 are asymmetrically arranged across the center line 11 of the seat 10.

Gains of the drive parts 110, 120 and the phase shift circuits 115, 125 can be adjusted respectively. Thus, as shown in FIG. 1, it is possible to adjust an addition ratio of the right sound signal S1 to the phase shifted signal S21 in the drive part 110 and an addition ratio of the left sound signal S2 to the phase shifted signal S12 in the drive part 120. In addition, it is possible to adjust sound pressure output from the right speaker 30 and from the left speaker 40 and it is also possible to adjust the balance of stereo sound between left and right.

The control unit 100 controls the characteristics of sound output from each speaker so that a stereophonic sound image produced by sounds output from the two speakers 30, 40 is maintained.

Sound S30 of the right channel and phase-shifted sound S40d of the left channel, which are output from the right speaker 30, and sound S40 of the left channel and phase-shifted sound S30d of the right channel, which are output from the left speaker 40, reach the right ear 21.

The sound of the right channel reaching the right ear 21 is the sound S30 of the right channel and the phase-shifted sound S30d of the right channel.

The sound of the left channel reaching the right ear 21 is the sound S40 of the left channel and the phase-shifted sound S40d of the left channel.

Based on this, the control unit 100 performs control so that a synthetic sound of the sound S30 of the right channel and the phase-shifted sound S30d of the right channel is maximized and a synthetic sound of the sound S40 of the left channel and the phase-shifted sound S40d of the left channel is minimized.

In order that the synthetic sound of the sound S30 of the right channel and the phase-shifted sound S30d of the right channel is maximized at the right ear 21, for example, the control unit 100 sets the phase difference α° so that the phase difference between the sound S30 travelling a distance L11 and the sound S30d travelling a distance L21 is 2πn (n=0, 1, 2 . . . ). Here, the distance L11 is a distance from the right speaker 30 to the right ear 21, and the distance L21 is a distance from the left speaker 40 to the right ear 21.

In order that the synthetic sound of the sound S40 of the left channel and the phase-shifted sound S40d of the left channel is minimized at the right ear 21, the phase difference α° is set so that the phase difference between the sound S40 travelling the distance L21 and the sound S40d travelling the distance L11 is πn (n=0, 1, 2 . . . ).

At the position of the right ear 21, the sound S30 of the right channel and the sound S40 of the left channel cancel each other out or crosstalk therebetween is reduced by the above-described setting in which the synthetic sound of the sound S40 of the left channel and the phase-shifted sound S40d of the left channel is minimized at the right ear 21.

Likewise, the sound S40 of the left channel and the phase-shifted sound S30d of the right channel, which are output from the left speaker 40, and the sound S30 of the right channel and the phase-shifted sound S40d of the left channel, which are output from the right speaker 30, reach the left ear 22.

The sound of the left channel reaching the left ear 22 is the sound S40 of the left channel and the phase-shifted sound S40d of the left channel.

The sound of the right channel reaching the left ear 22 is the sound S30 of the right channel and the phase-shifted sound S30d of the right channel.

Based on this, the control unit 100 performs control so that a synthetic sound of the sound S40 of the left channel and the phase-shifted sound S40d of the left channel is maximized and a synthetic sound of the sound S30 of the right channel and the phase-shifted sound S30d of the right channel is minimized.

In order that the synthetic sound of the sound S40 of the left channel and the phase-shifted sound S40d of the left channel is maximized at the left ear 22, for example, the control unit 100 sets the phase difference α° so that the phase difference between the sound S40 travelling a distance L22 and the sound S40d travelling a distance L12 is 2πn (n=0, 1, 2 . . . ). Here, the distance L22 is a distance from the left speaker 40 to the left ear 22, and the distance L12 is a distance from the right speaker 30 to the left ear 22.

In order that the synthetic sound of the sound S30 of the right channel and the phase-shifted sound S30d of the right channel is minimized at the left ear 22, the phase difference α° is set so that the phase difference between the sound S30 travelling the distance L12 and the sound S30d travelling the distance L22 is πn (n=0, 1, 2 ... ).

At the position of the left ear 22, the sound S40 of the left channel and the sound S30 of the right channel cancel each other out or crosstalk therebetween is reduced by the above-described setting in which the synthetic sound of the sound S30 of the right channel and the phase-shifted sound S30d of the right channel is minimized at the left ear 22.

Due to the phase shift controlled by the control unit 100, it is possible to allow sound to be localized at the ears and it is also possible to perform control so that a stereophonic sound image produced by sounds output from the two speakers is maintained.

The present embodiment is not limited to the use of two speakers and is also applicable to when not less than three speakers are arranged across the center line 11 of the seat 10. That is, taking into consideration the distance from the speaker to the ear of the occupant and the phase difference for the sound output from each speaker, the phase difference is set so that the synthetic sounds are maximized/minimized at the right ear and the left ear respectively, and this cancels out sounds of the right and left channels and reduces crosstalk therebetween. Thus, even in case that three or more speakers are provided, it is possible to allow sound to be localized at the ears and it is also possible to perform control so that a stereophonic sound image produced by sounds output from the three or more speakers is maintained.

Effects of the Embodiment

The following effects are obtained in the embodiment of the invention.

(1) The acoustic device 1 in the embodiment of the invention is mounted in the vehicle 5 and is provided with the two speakers 30, 40 arranged with the center line 11 of the seat 10 in-between and located in front of the driver 20 as an occupant sitting in the seat 10, and the control unit 100 that controls the characteristics of sound output from each speaker so that a stereophonic sound image produced by sounds output from the two speakers 30, 40 is maintained, wherein the two speakers 30, 40 are provided in the steering wheel 8 of the vehicle 5. Since each speaker is provided on the steering wheel 8 of the vehicle 5, it is possible to reduce the output of the speaker needed to deliver a prescribed level sound to the occupant.

(2) By configuring the speakers 30, 40 to be omnidirectional (non-directional), sound images produced by sounds output from the speakers are easily localized even when the steering wheel 8 is rotationally manipulated to drive the vehicle 5.

(3) It is possible to configured such that the speakers are provided respectively on the spokes 9 of the steering wheel 8, or alternatively, such that the speakers are provided respectively in the steering switches 50, 60 as switch devices mounted on the steering wheel 8. By configuring that each of the steering switches 50, 60 has the speaker, the switch device to be mounted on the steering wheel can have a sound notification means and it is thereby possible to expand the function of the steering switch.

(4) Since sound image localization can be controlled by the control unit 100 and particularly the speakers 30, 40 are configured to be omnidirectional (non-directional), sounds output from the speakers mounted on the steering wheel can be stably localized at the ears of the occupant (driver).

Although some embodiments of the invention have been described above, the embodiments are merely an example and the invention according to claims is not to be limited thereto. These new embodiments may be implemented in various other forms, and various omissions, substitutions and changes, etc., can be made without departing from the gist of the invention. In addition, all combinations of the features described in these embodiments are not necessary to solve the problem of the invention. Further, these embodiments are included within the scope and gist of the invention and also within the invention described in the claims and the equivalency thereof.

REFERENCE SIGNS LIST

1 ACOUSTIC DEVICE
5 VEHICLE
8 STEERING WHEEL
8a CENTER LINE
9 SPOKE
10 SEAT
11 CENTER LINE
20 DRIVER
21 RIGHT EAR
22 LEFT EAR
30 SPEAKER
40 LEFT SPEAKER
50, 60 STEERING SWITCH
100 CONTROL UNIT
110 DRIVE PART
115 PHASE SHIFT CIRCUIT
120 DRIVE PART
125 PHASE SHIFT CIRCUIT

The invention claimed is:

1. An acoustic device to be mounted in a vehicle, the acoustic device comprising:
at least two speakers arranged before a front face of an occupant sitting in a seat to sandwich a center line of the seat; and
a control unit that controls characteristics of sound output from each of the speakers such that a stereophonic sound image produced by sounds output from the at least two speakers is maintained,
wherein the at least two speakers are installed on a steering wheel of the vehicle,
wherein one of the at least two speakers which is located on a right side with respect to the center line is positioned so as to provide a directivity increased toward a right ear of the occupant, and one of the at least two speakers which is located on a left side with respect to the center line is positioned so as to provide a directivity increased toward a left ear of the occupant, and
wherein an output directivity of the at least two speakers, respectively is omnidirectional in a plane orthogonal to the direction between the right side speaker and left side speaker and the right and left ears of the occupant, respectively, such that the resulting sound image from the right and left speakers remains localized even when the steering wheel is rotationally manipulated to drive the vehicle.

2. The acoustic device according to claim 1, wherein the at least two speakers are symmetrically arranged with respect to a center line of the steering wheel.

3. The acoustic device according to claim 1, wherein the at least two speakers are arranged to face upward at a predetermined angle such that an output axis thereof is in a direction of an ear of the occupant.

4. The acoustic device according to claim 1, wherein the at least two speakers are installed on a switch device mounted on the steering wheel.

5. The acoustic device according to claim 1, wherein the at least two speakers are arranged on right and left spokes of the steering wheel or in a switch part on the right and left spokes of the steering wheel.

6. The acoustic device according to claim 1, wherein the control unit comprises a phase shift means and an adding means,
   wherein the phase shift means performs a phase-delay processing to delay a phase of a sound signal of a right channel corresponding to one of the at least two speakers located on a right side with respect to the center line and a phase of a sound signal of a left channel corresponding to one of the least two speakers located on a left side with respect to the center line, and
   wherein the adding means outputs a drive signal of the right and left channels, respectively by adding the sound signal of the right channel to the sound signal of the left channel phase-delayed by the phase shift means and the sound signal of the left channel to the sound signal of the right channel phase-delayed by the phase shift means, and
   wherein the phase-delay processing and the drive signal processing are dependent on a predetermined distance between the right side speaker and left side speaker and the right and left ears of the occupant such that the resulting sound image from the right and left speakers remains localized even when the steering wheel is rotationally manipulated to drive the vehicle.

7. The acoustic device according to claim 6, wherein the control unit sets respective phase differences for the phase shift means such that, at a right ear of the occupant, a synthetic sound of sound based on the sound signal of the right channel and sound based on the sound signal of the right channel phase-delayed by the phase shift means is maximized and a synthetic sound of sound based on the sound signal of the left channel and sound based on the sound signal of the left channel phase-delayed by the phase shift means is minimized, and at a left ear of the occupant, a synthetic sound of sound based on the sound signal of the left channel and sound based on the sound signal of the left channel phase-delayed by the phase shift means is maximized and a synthetic sound of sound based on the sound signal of the right channel and sound based on the sound signal of the right channel phase-delayed by the phase shift means is minimized.

8. The acoustic device according to claim 7, wherein the control unit sets the respective phase differences for the phase shift means such that, at the right ear, a phase difference between the sound based on the sound signal of the right channel and the sound based on the sound signal of the right channel phase-delayed by the phase shift means is $2\pi n$ ($n=0, 1, 2 \ldots$) and a phase difference between the sound based on the sound signal of the left channel and the sound based on the sound signal of the left channel phase-delayed by the phase shift means is $\pi n$ ($n=0, 1, 2 \ldots$), and at the left ear, a phase difference between the sound based on the sound signal of the left channel and the sound based on the sound signal of the left channel phase-delayed by the phase shift means is $2\pi n$ ($n=0, 1, 2 \ldots$) and a phase difference between the sound based on the sound signal of the right channel and the sound based on the sound signal of the right channel phase-delayed by the phase shift means is $\pi n$ ($n=0, 1, 2 \ldots$).

* * * * *